United States Patent [19]

Grandjean

[11] 3,957,077

[45] May 18, 1976

[54] VALVE AND MEANS FOR OPERATING THE VALVE

[75] Inventor: George Victor Grandjean, Freeport, Tex.

[73] Assignee: The Dow Chemical Company, Midland, Mich.

[22] Filed: May 12, 1975

[21] Appl. No.: 576,498

[52] U.S. Cl. .................................. 137/383; 251/292
[51] Int. Cl.² .......................................... F16K 35/00
[58] Field of Search ............. 137/377, 383; 251/292

[56] References Cited
UNITED STATES PATENTS

| | | | |
|---|---|---|---|
| 1,135,731 | 4/1915 | Smyser | 251/292 X |
| 2,176,399 | 10/1939 | Garrett | 137/383 X |
| 2,561,531 | 7/1951 | Mueller | 251/292 X |

*Primary Examiner*—Henry T. Klinksiek
*Attorney, Agent, or Firm*—V. Dean Clausen; Lloyd S. Jowanovitz

[57] ABSTRACT

Many chemical reactions involving high pressures are carried out in reactor or distillation vessels. As a safety feature, the vessel is usually connected into an alarm system designed to shut it down if an overpressure condition occurs. During a routine safety check of the alarm system the vessel is isolated from the system by manually closing a valve. Following the safety check, the valve must again be opened to connect the vessel into the system. Some situations may require that a valve be left in closed position following a safety check, or some other operation.

The valve of this invention can only be closed or opened with a key member which engages the valve stem. The key is an integral part of the equipment carried by the technician who makes the safety check, so that the act of disengaging the key from the valve stem ensures that the valve is left in either open or closed position, as desired.

3 Claims, 4 Drawing Figures

VALVE AND MEANS FOR OPERATING THE VALVE

BACKGROUND OF THE INVENTION

Broadly, the invention relates to the combination of a valve and a means for operating the valve. More specifically, the invention is directed to a valve which is operated by a key member, the key member being a safety device.

In the chemical, the petrochemical, and the refinery industries many chemical reactions, or separations, are conducted in an apparatus referred to as a reactor vessel, or a distillation vessel. For those reactions which involve high pressures, the reactor is usually equipped with safety devices to prevent the possibility of explosions. In one type of safety system a conduit from the vessel connects the vessel into a pressure switch, and a shut off valve is usually installed in the conduit between the vessel and the switch. The switch is usually connected electrically to an alarm system, which has direct control over the reactor. The pressure switch is set at a predetermined limit which is considered a safe operating pressure. If the pressure in the reactor exceeds the limit setting, it will close the circuit to the pressure switch, which, in turn, will activate the alarm system and immediately shut down the reactor.

A routine safety procedure calls for periodically checking the operation of the alarm system. The procedure should include checking out the operation of the pressure switch, but frequently this is not done. To check the operation of the pressure switch, the switch must first be isolated from the reactor by closing the valve ahead of the switch. Closing the valve, therefore, adds an additional hazard if the technician should forget to open the valve after the safety check has been completed. The hazard can be further compounded if there is no periodic check of the pressure switch, since a malfunction in the switch could result in failure to activate the alarm system during a condition of overpressure in the reactor.

SUMMARY OF THE INVENTION

Accordingly, it is an object of the invention to provide a means for operating a valve in an alarm system, a vent or drain system, or a sample system, which will insure that the valve is either opened or closed, as desired, following a check out procedure, or some other operation.

The invention provides a valve which requires a key member for operating the valve. Basic components of the valve are a valve body, which includes a central bore for carrying fluid through the valve. A valve stem is rotatably carried in a stem housing mounted on the valve body. The stem attaches to a valve closure positioned in the valve body. Rotating the valve stem in one direction moves the valve closure to an open position, which permits fluid flow through the valve bore. Rotating the valve stem in the opposite direction moves the closure to a closed position, which will block fluid flow through the valve bore.

An upstanding tubular member is attached to the upper end of the stem housing. The bore of the tubular member encloses the upper end of the valve stem and an internal fastener means is defined within the tubular bore. The key member for operating the valve consists of a handle and shank portion. In the shank of the key member is a bore designed to engage the upper end of the valve stem, so that the valve stem can be rotated by the key member. An external surface of the key shank includes an external fastener means adapted to engage the internal fastener means of the tubular bore while the valve stem is being rotated.

DESCRIPTION OF A PREFERRED EMBODIMENT

Figure 1:
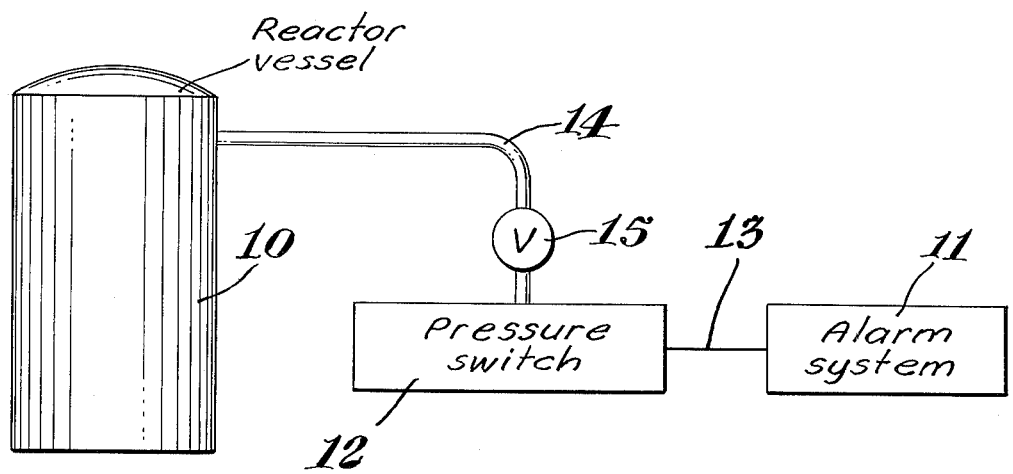
FIG. 1 is a schematic view of a reactor vessel and an alarm system for the vessel. The alarm system shown in FIG. 1 includes the key-operated valve of this invention.

Referring to FIG. 1 of the drawing, the numeral 10 indicates a reactor vessel, which includes an alarm system 11. The vessel 10 is a conventional apparatus of the type used in commercial production of chemical products. The alarm system 11 is made up of components which control the operation of the reactor (not shown). The purpose of the alarm system is to shut down the reactor in the event of an emergency situation, such as an overpressure condition, which could cause an explosion.

The alarm system 11 is activated by a pressure switch 12. One side of switch 12 is connected to the alarm system through an electrical lead 13. The opposite side of switch 12 is connected into vessel 10 by a conduit 14. The switch 12 will sense a condition of over pressure in the reactor 10 according to the amount of pressure in conduit 14. A valve 15 is installed in conduit 14 between the reactor 10 and pressure switch 12. The purpose of valve 15 is to be able to isolate the pressure switch 12 and alarm system 11 from reactor 10, for reasons such as making a safety check, or repairing the system.

Figure 2:
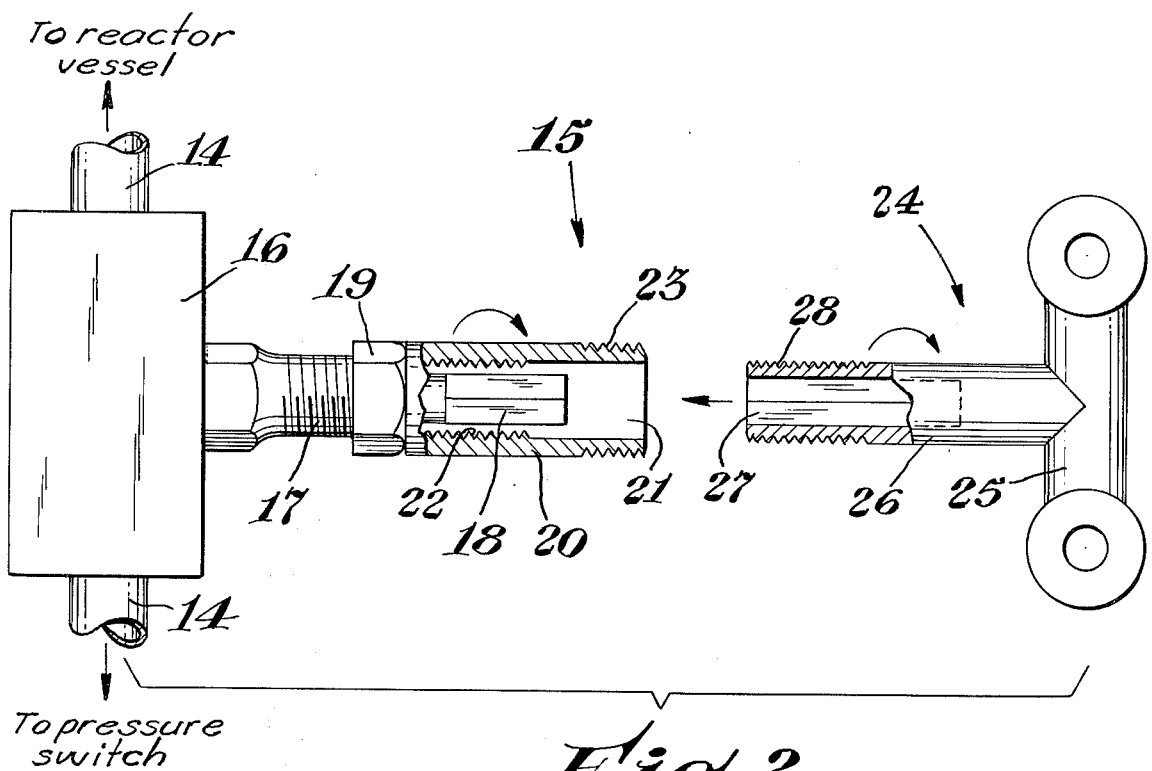
FIG. 2 is an exploded detail view, partly in section, of the valve and key combination of this invention.

Referring to FIG. 2 of the drawing, the valve 15 is shown in a larger detail view. According to the practice of the invention, the valve 15 can be any of the conventional shut off valves, of the rising stem type, which is designed for general service on fluid lines. In general, the type of valves which may be used are needle valves, globe valves, gate valves, plug valves, and the like. Typical closures for the valves would include plug closures, disc closures, or gate closures.

Figure 3:
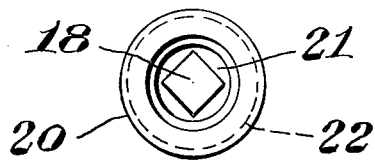
FIG. 3 is a right end elevation view of the valve of FIG. 2.

Valve 15 comprises a valve body 16 which includes a central bore (not shown) for carrying fluid through the valve. A stem housing 17 is mounted on valve body 16. Carried within the housing 17 is a rotatable stem 18 (rising stem). The lower end of valve stem 18 (not shown) includes a valve closure (not shown) which is positioned in the valve body 16. At the upper end of stem housing 17 is a packing nut 19, which provides a seal for stem 18. In conventional shut off valves the upper part of this stem is usually a round shape, and a wheel or a lever is attached to the stem for closing or opening the valve. In the valve of this invention the stem 18 is modified so that the extreme upper end of the stem has a generally square shape, as best shown in FIG. 3.

The lower end of a tubular member 20 is fastened at the periphery of the top face of packing nut 19. The member 20 can be joined to nut 19 by any suitable means, such as welding or brazing. As indicated in FIG. 2, the tubular member 20 has a lengthwise bore 21, which encloses the upper end of valve stem 18, and in the lower part of the bore 21 is defined an internal screw thread 22. Also, the tubular member 20 has an external screw thread 23 at the upper end of the member. Thread 23 provides means for fastening a screw cap (not shown) over the open end of tubular member 20. The purpose of the cap is to keep out grit and other foreign materials when the valve 15 is not in use.

Figure 4:
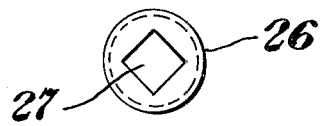
FIG. 4 is a left end elevation view of the key member of FIG. 2.

A key member 24 provides means for operating valve 15. A preferred form for the key 24 is a one-piece member which includes a crosswise handle 25 and a shank portion 26. Within the shank portion 26 is defined a lengthwise bore 27. The cross sectional configuration of bore 27 is a generally square shape, as shown in FIG. 4. The dimensions of bore 27 are slightly larger than that of stem 18, so that key 24 will fit down over stem 18. Key 24 also includes an external screw thread 28, which is defined along the external surface of shank 26. Both the external thread 28 and internal thread 22 are the same thread type, and each thread has the same pitch, so that these threads can interlock when stem 18 is engaged by key 24.

To illustrate the invention, a typical operation of the key-operated valve will now be described. The usual situation is one in which the valve 15 is normally open, so that the pressure switch 12 can sense an overpressure condition in the reactor 10. If it is desired to check out the pressure switch and/or the alarm system, the valve 15 must be closed to isolate the alarm components from the reactor. The first step is to fit the key 24 over the valve stem 18, so that thread 28 fully engages thread 22. For convenience in explaining the shut off procedure, assume that the threads 22 and 28 are right hand threads. The next step is to turn the key 24 to the right (clockwise) far enough for the valve stem 18 to seat the closure and shut off the valve.

After the safety check, or other work on the alarm system components is finished, valve 15 is opened by turning key 24 to the left (counterclockwise) far enough to disengage thread 28 from thread 22. The use of the key 24, therefore, provides a simple procedure which will ensure that the valve 15 is left open after the work on the alarm system is finished. The key 24 thus provides a safety feature in that (1) as part of his routine the technician is required to remove the key from the valve before going on to the next job, and (2) the act of disengaging the key from the valve "automatically" opens the valve.

Regarding the threads 22 and 28, it was mentioned earlier that these threads are the same type and pitch, so that key 24 will interlock with stem 18. In actual practice, the pitch of threads 22 and 28 (number of threads per inch) should be greater than the pitch of the threads on valve stem 18 (threads not shown). The reason for this construction is to enable the key 24 to advance or reverse in tubular member 20 slightly faster than stem 18 can advance or reverse in valve body 16. This insures that key 24 will get a good hold on stem 18, so that the valve can be completely closed or opened, as desired.

There are various embodiments and operating conditions other than those described above which are within the scope of this invention. For example, there are some chemical operations in which the valve 15 would be normally closed (instead of open) during the time between safety checks, repairs, or the like. In a situation where the valve is normally closed the internal thread 22 and the external thread 28 should be left hand threads. In this situation the key 24 would be fitted to the valve stem 18 in the same manner as described above, and by turning the key to the left (counterclockwise), the valve would open. At the end of the job, therefore, the key could only be removed from the valve by turning it right (clockwise), which would close the valve.

In the embodiment illustrated herein the tubular member 20 is fastened to packing nut 19. For an alternative embodiment, the tubular member and packing nut could be fabricated as a one-piece member. The lower part of the tubular member, therefore, would be threaded directly onto stem housing 17 and the tubular member would perform the same sealing function as the packing nut. In another embodiment the shank 26 of key 24 could be equipped with projecting lugs adapted to engage a bayonet-type slot in tubular member 20. The object is to lock the key 24 into tubular member 20 after a quarter turn of stem 18, to open or close the valve 15. The lock mechanism is similar to that used for seating an automobile light bulb in its socket. The arrangement would be particularly suitable for valves which require a quarter turn of the stem to open or close, such as certain types of ball valves or plug valves.

Another possible application for the valve and key combination of this invention is in sampling of liquid chemical compositions. For example, the sample is frequently taken from a line which includes a shut off valve. The valve could be designed for operation with a key, as described herein. This would eliminate the hazard of unintentionally leaving a line open which contained toxic or corrosive materials. Another application in which the present valve and key combination could be used is for vent and bleed lines in some processes. The situation usually requires keeping the vent or bleed line open when the process is shut down, and then closing the line before re-pressuring the system, to prevent loss of material or possible hazard to personnel in the vicinity.

The invention claimed is:

1. In combination, a valve, and a key member for operating the valve, the combination including:
  a valve body including a bore for carrying fluid through the valve;
  a valve closure which is positioned in the valve body;
  a valve stem housing which is mounted on the valve body, and which includes an upper end;
  a valve stem which includes an upper and lower end, the stem being rotatably carried in the stem housing, the lower end of the stem being attached to the valve closure, and the stem being rotatable to move the valve closure to an open position which permits fluid flow through the valve bore, and to a closed position which will block fluid flow through the valve bore;
  a tubular member which includes an upper and lower end, the lower end being fastened to the upper end of the valve stem housing, the tubular member having a bore which encloses the upper end of the valve stem, and the tubular bore including an internal fastener means defined within the bore;
  a key member which is defined by a handle and a shank portion, the shank including a bore therein which is adapted to engage the upper end of the valve stem, to enable the valve stem to be rotated by the key member, the shank including an external fastener means which is adapted to engage the internal fastener means of the tubular member while the valve stem is being rotated.

2. The valve and key combination of claim 1 in which the internal fastener means is a right hand internal screw thread, and the external fastener means is a right hand external screw thread.

3. The valve and key combination of claim 1 in which the internal fastener means is a left hand internal screw thread, and the external fastener means is a left hand external screw thread.

* * * * *